US012479380B2

(12) United States Patent
Schmidt et al.

(10) Patent No.: US 12,479,380 B2
(45) Date of Patent: Nov. 25, 2025

(54) METHOD FOR OPERATING ON-BOARD ELECTRICAL SUBSYSTEM, ON-BOARD ELECTRICAL SUBSYSTEM, AND VEHICLE

(71) Applicant: FORD GLOBAL TECHNOLOGIES, LLC, Dearborn, MI (US)

(72) Inventors: Christian Schmidt, Saarwellingen (DE); Björn Mohrmann, Aachen (DE); Patrick Opree, Würselen (DE)

(*) Notice: Subject to any disclaimer, the term of this patent is extended or adjusted under 35 U.S.C. 154(b) by 0 days.

(21) Appl. No.: 18/754,681

(22) Filed: Jun. 26, 2024

(65) Prior Publication Data
US 2025/0018886 A1    Jan. 16, 2025

(30) Foreign Application Priority Data
Jul. 12, 2023   (DE) .......................... 102023118497.0

(51) Int. Cl.
*B60R 16/03*         (2006.01)
(52) U.S. Cl.
CPC .................................. *B60R 16/03* (2013.01)
(58) Field of Classification Search
CPC ..................................................... B60R 16/03
USPC ........................................................ 307/10.1
See application file for complete search history.

(56) References Cited

U.S. PATENT DOCUMENTS

| | | | |
|---|---|---|---|
| 10,449,917 B2 | 10/2019 | Mohrmann et al. | |
| 2010/0102626 A1* | 4/2010 | Tachibana | H02J 1/08 307/9.1 |
| 2019/0126866 A1* | 5/2019 | Sato | H02J 7/0031 |
| 2021/0066956 A1* | 3/2021 | Izawa | H02J 7/0063 |
| 2021/0276425 A1* | 9/2021 | Gauthier | H02J 7/0063 |
| 2022/0021223 A1 | 1/2022 | Wang et al. | |
| 2022/0063414 A1 | 3/2022 | Kim et al. | |
| 2023/0001869 A1* | 1/2023 | Gronau | H02M 3/003 |
| 2023/0318345 A1* | 10/2023 | Morita | H02J 7/00 320/163 |

* cited by examiner

*Primary Examiner* — Michael R. Fin
(74) *Attorney, Agent, or Firm* — Frank Lollo; Eversheds Sutherland (US) LLP

(57) ABSTRACT

The present disclosure generally relates to an on-board electrical subsystem which has an overall electrical supply circuit having at least a first actuator, a load, a first voltage source, a second voltage source, and at least one switching device. A total power requirement of the first actuator is determined. If the total power requirement exceeds a first power threshold value, then a first supply subcircuit and a second supply subcircuit are formed. The first supply subcircuit comprises the first actuator and the first voltage source to provide a high voltage amplitude to the first actuator. The first supply subcircuit and the second supply subcircuit are electrically separated from one another. The second supply subcircuit supplies a standard voltage amplitude to the load. The separation of the first voltage source from the second voltage source and the load avoids corresponding power losses.

9 Claims, 4 Drawing Sheets

METHOD FOR OPERATING ON-BOARD ELECTRICAL SUBSYSTEM, ON-BOARD ELECTRICAL SUBSYSTEM, AND VEHICLE

CROSS REFERENCE TO RELATED APPLICATIONS

This application claims priority to application 102023118497.0, filed in the German Patent and Trademark Office on Jul. 12, 2023, which is incorporated herein by reference in its entirety.

STATEMENT REGARDING FEDERALLY SPONSORED RESEARCH

Not Applicable.

BACKGROUND OF THE INVENTION

The present disclosure generally relates to a method for operating an on-board electrical subsystem for a vehicle, to an on-board electrical subsystem for a vehicle, and to a vehicle.

Vehicles having at least partially electrically driven components have actuators by means of which these components are able to be moved. For example, electronic steering systems have actuators by means of which a desired steering movement is obtained. Depending on the desired steering movement (for example, the steering torque that is to be obtained or the steering speed that is to be obtained), the actuators involved have an electrical power requirement that is to be met in order to also actually be able to ensure the corresponding actuation movements. This means that a specified electrical power must be provided to the actuators in order to be able to achieve the intended actuation movement at all.

The corresponding on-board electrical subsystem of a vehicle must be configured to be able to satisfy this power requirement of the actuators. For this purpose, the on-board electrical subsystem has at least one correspondingly designed variable voltage source. In addition to the variable voltage source, however, the on-board electrical subsystems usually also have passive voltage sources, for example energy storage devices.

However, vehicles are operated in different drive states, for example by corresponding drive control systems. These drive states differ in terms of the intended actuation movements which are to be ensured by the underlying actuators. The vast majority of the drive states are designed in such a way that the actuators have at most one standard power requirement which is to be obtained from the voltage sources of the on-board electrical subsystem. In this case, the variable voltage source is configured to be able to provide a current having a predetermined current amplitude with a predetermined voltage amplitude in order to satisfy this standard power requirement. Differing from this, however, a relatively small amount of driving states are typically provided which can only be achieved by an increased power requirement of the actuators, for example in particular driving situations such as the activation of particular driving functionalities. In this case, in these driving states, the increased power requirement of the actuators is greater than the standard power requirement which the actuators otherwise require. In order to be able to satisfy both the standard power requirement and the increased power requirement, at least the variable voltage sources of the on-board electrical subsystems have previously been designed in such a way that they are rated at the increased power requirement. This means that they are overprovisioned with regard to the standard power requirement. As a result, previous approaches are expensive and complex.

In addition to this, actuators usually have a limited current carrying capacity. This means that the usable current amplitude is limited to satisfying the respective power requirement. The variable voltage source of the underlying on-board electrical subsystem is then controlled in such a way that it provides an increased voltage amplitude (greater than the standard voltage amplitude) in order to be able to satisfy the increased power requirement. In this case, however, passive voltage sources of the on-board electrical subsystem which are designed with regard to the standard voltage amplitude can act as power sinks, as a result of which the power loss of the on-board electrical subsystem is increased.

In an alternative approach, an additional variable voltage source is required in order to be able to satisfy the overall power requirement of the on-board electrical subsystem in the particular driving situation with the increased power demand of the actuators, however, this approach is complex.

US Patent Application Publication US2022/0063414A1 discloses a supply circuit for a vehicle having two voltage sources and a plurality of loads, wherein a redundancy of the voltage supply is provided by a plurality of control devices in the event of a fault.

US Patent Application Publication US2022/0021223A1 discloses an electrical supply system for an aircraft, wherein a plurality of separate current supply units having separate passive energy stores can be combined or separated independently of one another by a control device by means of switching devices in order to adjust the provided power to match the load. A variable voltage source and the fact of ensuring that the voltage amplitude is raised above a standard voltage amplitude are not provided.

There is a need to provide a method for operating an on-board electrical (sub)system of a vehicle, by means of which method the power loss of the on-board electrical (sub)system of the vehicle is able to be reduced.

SUMMARY OF THE INVENTION

The object is achieved by the subject matter of the independent patent claims. Advantageous configurations are specified in the dependent patent claims and the following description, each of which configurations, individually or in (sub) combination, can constitute aspects of the disclosure. Some features are explained with regard to methods, others with regard to devices. The corresponding aspects can be correspondingly reciprocally transferred, however.

According to one aspect, some embodiments relate to a method for operating an on-board electrical subsystem for a vehicle. The on-board electrical subsystem has an overall supply circuit having at least a first actuator, a load, a first voltage source, a second voltage source, and at least one switching device. At least the first voltage source is a variable voltage source. The first and the second voltage source output voltages have a standard voltage amplitude in a normal state of the on-board electrical subsystem. The method has at least the following steps:
  a total power requirement of the at least first actuator is determined;
  if the total power requirement exceeds a first power threshold value then:

a first supply subcircuit is formed by means of the at least one switching device. The first supply subcircuit comprises at least the first actuator and the first voltage source; and a second supply subcircuit is formed by means of the at least one switching device. The second supply subcircuit comprises at least the load and the second voltage source. The second supply subcircuit is separated from the first supply subcircuit by means of the at least one switching device;

the first voltage source provides a voltage having a high voltage amplitude for the first supply subcircuit, which high voltage amplitude is increased with respect to the standard voltage amplitude.

This means that the actuator has a total power requirement which is greater than a standard power requirement which the actuator requires in the normal state. Since the actuator has a limited current carrying capacity, the total power requirement in this case can only be covered when the voltage amplitude of the voltage provided by the variable voltage source is increased with respect to the standard voltage amplitude. However, since the passive voltage sources cannot provide voltages having increased voltage amplitudes, they act as power sinks in the on-board electrical subsystem in this case. This could actually cause power losses. This effect can be avoided by separating and splitting into two separate supply subcircuits. In particular, it is then possible to provide only the relevant components, that is to say the actuators here, which have an increased power requirement and a limited current carrying capacity with a voltage which has a voltage amplitude which is increased with respect to the standard voltage amplitude. The occurrence of undesired power sinks in the corresponding supply subcircuit is thus prevented. Consequently, the power loss can be reduced. In other words, the efficiency of the overall supply system is increased. In this case, no additional variable voltage source is required in order to achieve these advantages. The method explained here is therefore compact and has low complexity. In the present case, the on-board electrical subsystem of the vehicle can be understood to mean a part of the electrical supply system of the vehicle which comprises the mentioned components. The on-board electrical subsystem can also form the entire on-board electrical system of the vehicle. The on-board electrical subsystem can optionally comprise further loads, voltage sources, actuators, or switching devices. The on-board electrical subsystem can be separable from the rest of the on-board electrical system of the vehicle, for example by way of corresponding switching devices.

In the present case, the overall supply circuit is to be understood to mean only the circuit of the on-board electrical subsystem. The overall supply circuit is not limited to reflecting the entire electrical supply system of the vehicle.

In an alternative, another load can also be relevant instead of an actuator. In this case, however, this load has a predetermined limited current carrying capacity. This means that it is a load for which, above a predetermined limit, the supply with an electrical power is only able to be achieved by increasing the provided voltage amplitude. Increasing the current amplitude is precluded above the predetermined limited current carrying capacity which in this sense constitutes a current threshold value.

In the present case, the variable voltage source can be understood to mean a voltage source which is able to be variably adjusted in terms of the provided current amplitude and the provided voltage amplitude, at least within the scope of predefined parameter ranges.

In the present case, the normal state can be understood to mean a state of the on-board electrical subsystem of the vehicle for which the total power requirement does not exceed the first power threshold value.

In the present case, the standard voltage amplitude can be understood to mean a voltage amplitude which is enough to satisfy all power requirements of all loads in the normal state of the on-board electrical subsystem. For example, the standard voltage amplitude can also correspond to that voltage amplitude which can be achieved by the further, non-variable voltage sources, for example passive voltage sources, such as energy storage devices. In this sense, the standard voltage amplitude constitutes a nominal voltage amplitude on the basis of which the on-board electrical subsystem is used in the normal state.

In the present case, the high voltage amplitude can be understood to mean a voltage amplitude which is required to satisfy the overall power requirement of the at least one actuator, insofar as the latter exceeds the first power threshold value. As a result, the variable voltage source can provide an electrical power which is greater than that provided in the normal state of the on-board electrical subsystem.

The second voltage source can optionally comprise a non-variable voltage source, for example an energy storage device, such as a capacitor.

Preferably, the second voltage source provides a voltage having a low voltage amplitude for the second supply subcircuit whenever the total power requirement of the at least one actuator exceeds the first power threshold value. The low voltage amplitude is less than the standard voltage amplitude which is provided by the voltage sources in the normal state of the on-board electrical subsystem. Whenever the first power threshold value is exceeded, the actuator is separated from the rest of the loads by the separation into two different supply subcircuits. Consequently, the second supply subcircuit has a reduced power requirement overall. It can therefore be enough if the second voltage source provides a voltage having a reduced voltage amplitude. Consequently, each supply subcircuit can be supplied with a voltage that meets its requirement in an optimized way. The total power loss as the sum of the power losses of the individual supply subcircuits can thus be further reduced.

In some embodiments, the on-board electrical subsystem has at least a second actuator. The total power requirement then comprises the combined total power requirement of the first actuator and of the second actuator. The first supply subcircuit then additionally has at least the second actuator. This means that all those components of the on-board electrical subsystem which have a mutually corresponding limited current carrying capacity can be combined in the first supply subcircuit. In this case, the combined total power requirement results as the sum of the total power requirements of these components. For example, the on-board electrical subsystem can also have more actuators which have a current carrying capacity which corresponds to that of the other actuators. The group of the actuators is then considered together. The combined total power requirement then results based on this group. In the event of the separation into different supply subcircuits, the entire group is combined in the first supply subcircuit.

In an alternative, it is also possible to selectably form different supply subcircuits which each comprise one or more actuators (or loads) which have a mutually corresponding current carrying capacity. The formation of a corresponding supply subcircuit largely depends on what electrical power can be provided by the first voltage source.

Whenever a plurality of different supply subcircuits which each comprise one or more actuators are formed, each of these supply subcircuits has at least one variable voltage source. The exceedance of the first power threshold value is then considered separately for each supply subcircuit or for each relevant group of actuators.

Preferably, an overall supply circuit is produced again from the first supply subcircuit and the second supply subcircuit by means of the at least one switching device whenever the total power requirement falls below a second power threshold value. The first and the second voltage source output voltages having the standard voltage amplitude once the overall supply circuit is formed. This means that the separation into different supply subcircuits can reflect in particular a temporary state of the on-board electrical subsystem of the vehicle. Such high power requirements of an actuator or plurality of actuators are routinely only required in exceptional cases, for example due to a special driving situation. It is therefore advantageous if the separated supply subcircuits can be combined again. In particular, since the formation of the separated supply subcircuits is usually only required for short periods of time, the present method is advantageous insofar as that no overcapacities or additional variable voltage sources are required to be able to satisfy the short-term power peaks. The overall efficiency of the on-board electrical subsystem of the vehicle is therefore increased.

The first power threshold value and the second power threshold value are optionally the same. This constitutes a particularly compact control variant. In an alternative, the first power threshold value and the second power threshold value are different. In this case, hysteresis can be ensured so that fluctuation between the two formations of the on-board electrical subsystem is prevented.

Preferably, the overall supply circuit can also be produced again from the first supply subcircuit and the second supply subcircuit by means of the at least one switching device whenever a predetermined duration has elapsed. This prevents the first voltage source from being disproportionately heavily loaded.

In some embodiments, the total power requirement is determined based at least on one measured vehicle parameter. In this case, the measured vehicle parameter can in particular comprise at least one of a vehicle speed, a steering wheel rotation speed, an ambient temperature, a temperature at least of one voltage source, and a state of charge at least of one energy storage device. As already explained, the total power requirement of the at least one actuator substantially depends on the intended actuation movement of the actuator. This can be determined, for example, by a drive control device on the basis of the respective driving situation. In this case, the above-mentioned measured vehicle parameters can be relevant in determining the intended actuation movement. Consequently, the total power requirement of the actuator or the combined total power requirement of the actuators can be determined on the basis of the intended actuation movement of the actuator or of the actuators. The total power requirement of the actuator therefore largely depends on the mentioned measured vehicle parameters. Optionally, further vehicle parameters can likewise be used to determine the total power requirement of the actuator.

Even though vehicle parameters have been spoken about here, the total power requirement can in principle be able to be determined on the basis of any kind of device parameters provided that the respective device parameter is such that it defines an intended actuation movement of the actuator. The term "vehicle" should therefore be interpreted broadly.

The method for operating an on-board electrical subsystem and the on-board electrical subsystem as explained herein are not limited to having to be part of a vehicle. Generally, they can also be components of other devices, for example industrial robots or the like.

According to a further aspect, some embodiments relate to an on-board electrical subsystem for a vehicle. The on-board electrical subsystem has an overall supply circuit having at least a first actuator, a load, a first voltage source, a second voltage source and at least one switching device. At least the first voltage source is a variable voltage source. The first and the second voltage source are configured to output voltages having a standard voltage amplitude in a normal state of the on-board electrical subsystem. A control device is coupled at least to the at least one switching device and the first voltage source. The control device is configured at least to:
  determine a total power requirement of the first actuator, and if the total power requirement exceeds a first power threshold value:
    selectably forming a first supply subcircuit by means of the at least one switching device, wherein the first supply subcircuit comprises at least the first actuator and the first voltage source; and
    selectably forming a second supply subcircuit by means of the at least one switching device wherein the second supply subcircuit comprises at least the load and the second voltage source, and wherein the second supply subcircuit is separated from the first supply subcircuit by means of the at least one switching device;
  wherein the first voltage source is configured to provide a voltage having a high voltage amplitude for the first supply subcircuit, which high voltage amplitude is increased with respect to the standard voltage amplitude.

This means that the relevant control functionalities and the separation into different supply subcircuits are initiated and monitored by the control device. The control device is therefore coupled to the at least one switching device. In addition, the control device is coupled to the first voltage source in order to ensure an increased voltage amplitude, namely the high voltage amplitude. The advantages achieved by the method explained herein are also correspondingly achieved by the on-board electrical subsystem explained here.

Preferably, the on-board electrical subsystem has at least a plurality of switching devices. The plurality of switching devices are coupled to the control device and arranged in such a way that it is possible to ensure an electrical bypass for each actuator independently of the second voltage source. As a result, each actuator can be advantageously separated from other loads of the on-board electrical subsystem as required and taken into account in the first supply subcircuit whenever this is justified by the power requirement of the respective actuator.

Optionally, each actuator is assigned at least two switching devices which are coupled to the control device. This ensures that at least one electrical bypass is able to be realized in a particularly compact manner for each actuator. The electrical bypass can ensure the formation of a separated supply subcircuit, namely with regard to this actuator and independently of the necessary or possible separation of other actuators.

In some embodiments, the control device is configured to selectably adjust the high voltage amplitude of the first voltage source to match the determined total power requirement. This means that the control device can control the first voltage amplitude in such a way, in particular can raise it above the standard voltage amplitude in such a way, that the total power requirement can be satisfied. As a result, the high voltage amplitude is matched to the total power requirement as required. Overcapacities can thus be avoided.

The control device is optionally coupled to at least one sensor. The sensor is configured to measure at least one vehicle parameter and to transmit the latter to the control device. The control device is then configured to obtain at least information about one measured vehicle parameter. In particular, the vehicle parameter is at least one of a vehicle speed, a steering wheel rotation speed, an ambient temperature, a temperature at least of one voltage source, and a state of charge at least of one energy storage device. Based on the vehicle parameters received by the control device, the control device can then determine the total power requirement of the at least one actuator. A basis for decision-making can thus be created as to whether separation of the on-board electrical subsystem into separate supply subcircuits is necessary. In addition, a basis for decision-making can thus also be created as to whether recombination of the supply subcircuits is possible. This may be the case, for example, when the total power requirement falls below the second power threshold value.

Preferably, the on-board electrical subsystem is in the form of a so-called 12 V on-board electrical subsystem. In this case, the first voltage source is configured to output a signal having a standard voltage amplitude of 12 V. Additionally, further voltage sources, for example passive and/or non-variable voltage sources, can also be configured to nominally provide signals having a voltage amplitude of 12 V.

In an alternative, the on-board electrical subsystem can also be nominally configured for other voltage amplitudes, for example as a so-called 48 V on-board electrical subsystem, having a first voltage source which is configured to output a signal having a standard voltage amplitude of 48 V.

As a further alternative, the on-board electrical subsystem can also be nominally configured for other voltage amplitudes, for example as a so-called high-voltage on-board electrical subsystem, e.g., a 400 V or 800 V on-board electrical subsystem, having a first voltage source which is configured to output a signal having a standard voltage amplitude of 400 V or 800 V.

Other nominal voltage amplitudes are likewise conceivable.

According to a further aspect, some embodiments also relate to a vehicle having an on-board electrical subsystem which is able to be operated according to the method as described herein, or having an on-board electrical subsystem as described herein.

The advantages which have been explained with regard to the on-board electrical subsystem or to the method are correspondingly also achieved by the explained vehicle.

In the sense of the present disclosure, vehicles can in particular encompass land vehicles, namely, inter alia, off-road and road vehicles such as passenger cars, buses, trucks, and other commercial vehicles. Vehicles can be manned or unmanned. In addition to pure electric vehicles (BEVs), hybrid electric vehicles (HEVs) and plug-in hybrids (PHEVs) can also be encompassed.

All features explained with regard to the various aspects are able to be combined, individually or in (sub) combination, with other aspects.

BRIEF DESCRIPTION OF THE DRAWINGS

The disclosure and further advantageous embodiments and developments of the same are explained and described in more detail below with reference to the examples illustrated in the drawings. In the drawings.

DETAILED DESCRIPTION OF PREFERRED EMBODIMENTS

The description detailed below in combination with the attached drawings in which the same numbers refer to the same elements is intended to be a description of different embodiments of the disclosed subject matter and is not intended to constitute the only embodiments. Each embodiment described in this disclosure serves only as an example or illustration and should not be interpreted as preferred or advantageous with respect to other embodiments. The illustrative examples contained herein do not make any claim to completeness and do not limit the claimed subject matter to the exact disclosed forms. Various modifications to the described embodiments are readily apparent to the person skilled in the art, and the general principles defined herein can be applied to other embodiments and applications without departing from the spirit and scope of the described embodiments. The described embodiments are therefore not limited to the shown embodiments but rather have the largest possible scope of application compatible with the features and principles disclosed here.

All features disclosed below with regard to the exemplary embodiments and/or the accompanying figures can be combined, alone or in any subcombination, with features of the aspects of the present disclosure, including features of preferred embodiments provided that the resulting combination of features is meaningful to a person skilled in the art in the field of technology.

For the purposes of the present disclosure, the wording "at least one of A, B, and C" means for example (A), (B), (C), (A and B), (A and C), (B and C) or (A, B and C), including all further possible combinations, when more than three elements are listed. In other words, the term "at least one of A and B" generally means "A and/or B", namely "A" alone, "B" alone or "A and B".

Figure 1:
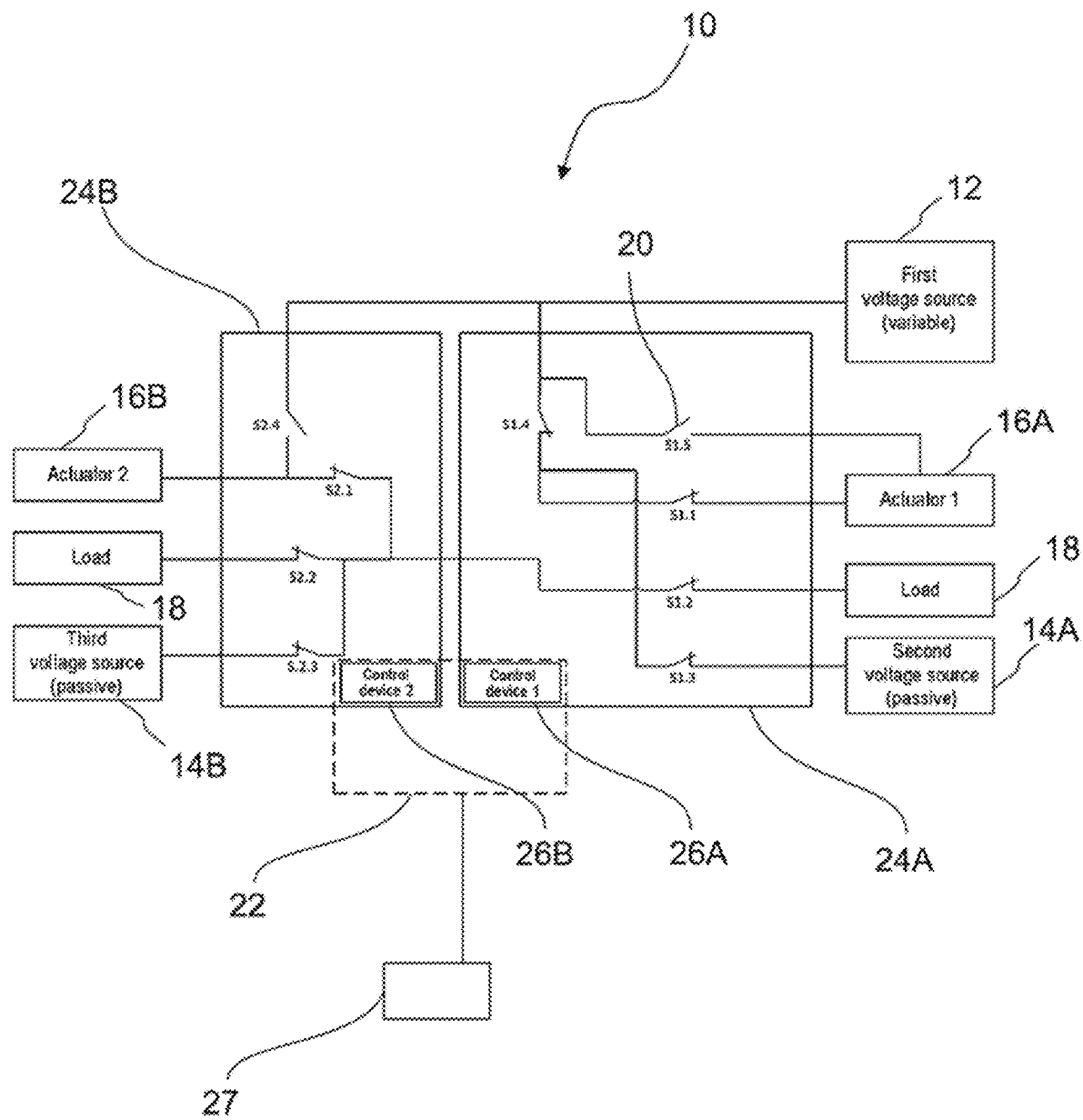
FIG. 1 shows a simplified schematic illustration of an on-board electrical subsystem of a vehicle according to one embodiment of the present disclosure.

FIG. 1 shows a simplified schematic illustration of an on-board electrical subsystem 10 of a vehicle according to one embodiment of the present disclosure. The on-board electrical subsystem 10 comprises a first voltage source 12 which is variable. The first voltage source 12 can, for example, constitute a main voltage source of the on-board electrical subsystem 10. This means that a current amplitude and a voltage amplitude of the signal that is output from the first voltage source 12 are able to be adjusted at least within predetermined parameter ranges.

Additionally, according to this embodiment, the on-board electrical subsystem 10 comprises a second voltage source 14A and a third voltage source 14B. The second voltage source 14A and the third voltage source 14B are passive, that is to say non-variable. The second voltage source 14A and the third voltage source 14B can, for example, be formed by energy storage devices.

In the present case, the on-board electrical subsystem 10 is in the form of a so-called 12 V on-board electrical subsystem. This means that the first voltage source 12 outputs a signal having a standard voltage amplitude of 12 V.

Here, the on-board electrical subsystem 10 is in the form of a DC voltage supply system. In an alternative, the on-board electrical subsystem 10 can also be in the form of an AC voltage supply system. Consequently, the second voltage source 14A and the third voltage source 14B also nominally provide signals having a voltage amplitude of 12 V.

In the present case, the on-board electrical subsystem 10 further comprises a first actuator 16A and a second actuator 16B. The actuators 16A, 16B have in particular a maximum current carrying capacity. This means that the actuators 16A, 16B may only be supplied with a current which has at most a predefined maximum current amplitude. The maximum current carrying capacity of the actuators 16A, 16B and the standard voltage amplitude of 12 V defines a standard range of the power consumption of the actuators 16A, 16B.

In an alternative, only a single actuator 16 is necessary in order to apply the method illustrated below.

According to this embodiment, the on-board electrical subsystem 10 additionally comprises a plurality of loads 18.

Furthermore, the on-board electrical subsystem 10 comprises a plurality of switching devices 20, here denoted by S1.1 to S1.5 and S2.1 to S2.4.

In principle, according to this embodiment, a switching device 20 is assigned to each component of the on-board electrical subsystem 10. As a result, each component can be separated from the on-board electrical subsystem 10 independently of other components. Specifically, the switch S1.2 is assigned to a load. The switch S1.3 is assigned to the second voltage source 14A. In the present case, the switches S1.1, S1.4 and S1.5 are assigned to the first actuator 16A. The switch S2.2 is furthermore assigned to a further load 18. The switch S2.3 is assigned to the third voltage source 14B. The switches S2.1 and S2.4 are assigned to the second actuator 16B.

The specific arrangement of the switching devices 20 is apparent from FIG. 1. However, on-board electrical subsystems 10 which have differing topologies are also conceivable.

In each case, according to this embodiment, the first actuator 16A is coupled to the first voltage source 12 via the closed switches S1.1 and S1.4. According to this embodiment, the second actuator 16B is coupled to the third voltage source 14B via the closed switch S2.1. According to this embodiment, coupling to the first voltage source 12 is prevented by the open switch S2.4.

The switching positions of the switching devices 20 are purely exemplary.

Differing therefrom, according to this embodiment, each actuator 16A, 16B is in each case assigned two switching devices, as a result of which the possibility of a bypass with regard to further components of the on-board electrical subsystem 10 and to the first voltage source 12 is created.

For example, the first actuator 16A is assigned the switches S1.1 and S1.5. In contrast, the second actuator 16B is assigned the switches S2.1 and S2.4.

Moreover, the on-board electrical subsystem 10 comprises a control device 22 which is coupled to the switching devices 20. For better visibility, the individual couplings are not illustrated in the figure.

In the present case, the switching devices 20 are arranged in such a way that a first switching distribution 24A is formed by the switches S1.1 to S1.5 and a second switching distribution 24B is formed by the switches S2.1 to S2.4. With regard to the different switching distributions 24A, 24B, according to this embodiment, the control device 22 therefore has two separate subcontrol devices 26A, 26B. In this case, the subcontrol device 26A controls the switching positions of the switches S1.1 to S1.5 of the switching distribution 24A. In contrast, the subcontrol device 26B controls the switching positions of the switches S2.1 to S2.4 of the switching distribution 24B.

Passive voltage sources, such as the second voltage source 14A, can thus for example be connected in or separated as required.

The formation of the control device 22 having two subcontrol devices 26A, 26B is merely optional. In an alternative, the control device 22 can also ensure the control of all the switching devices 20.

Additionally, according to this embodiment, the on-board electrical subsystem 10 comprises a sensor 27 which is coupled to the control device 22. The sensor 27 is configured to measure at least one vehicle parameter, such as, for example, a vehicle speed, and to transmit the latter to the control device 22.

In an alternative, the sensor 27 can also be formed externally to the on-board electrical subsystem 10. The control device 22 then receives the corresponding vehicle parameters only from the external sensor 27.

Figure 2:
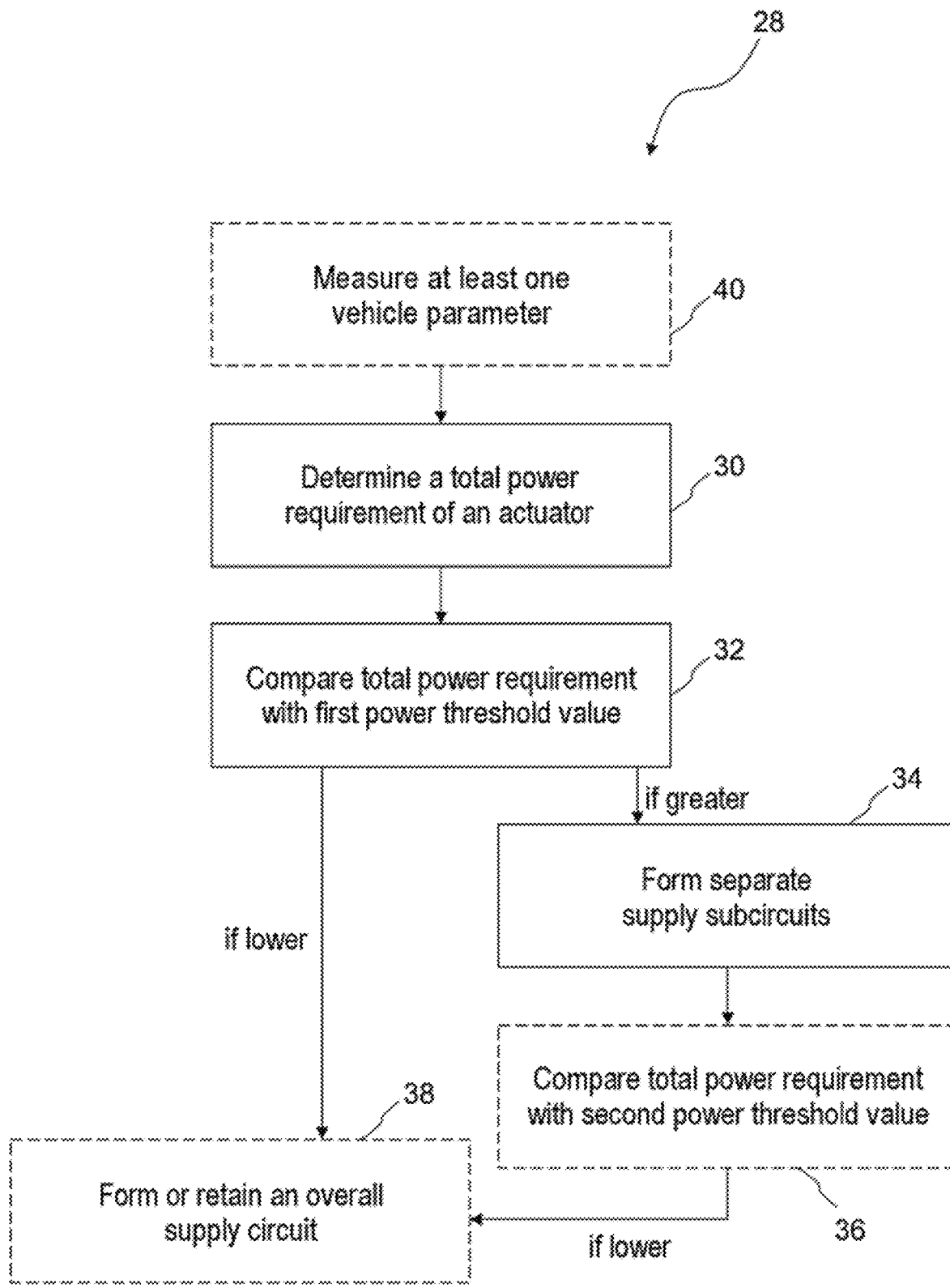
FIG. 2 shows a simplified schematic illustration of a method for operating the on-board electrical subsystem of a vehicle according to one embodiment of the present disclosure.

FIG. 2 shows a simplified schematic illustration of a method 28 for operating the on-board electrical subsystem 10 of a vehicle according to one embodiment of the present disclosure. Optional steps are illustrated by a dashed line.

In step 30, a total power requirement of the at least first actuator 16A is determined.

In step 32, the determined total power requirement of the first actuator 16A is compared with a first power threshold value.

If the total power requirement of the first actuator 16A exceeds the first power threshold value, a first supply subcircuit 42A is thus formed by means of the at least one switching device 20 in step 34. The first supply subcircuit 42A comprises at least the first actuator 16A and the first voltage source 12.

Furthermore, a second supply subcircuit 42B is formed by means of the at least one switching device 20. The second supply subcircuit 42B comprises at least the load 18 and the second voltage source 14A. The second supply subcircuit 42B is separated from the first supply subcircuit 42A by means of the at least one switching device 20.

In this case, the first voltage source 12 provides a voltage having a high voltage amplitude for the first supply subcircuit 42A, which high voltage amplitude is increased with respect to the standard voltage amplitude. Since the on-board electrical subsystem 10 is in the form of a 12 V on-board electrical subsystem in the present case, this means that the high voltage amplitude is greater than 12 V.

Figure 3:
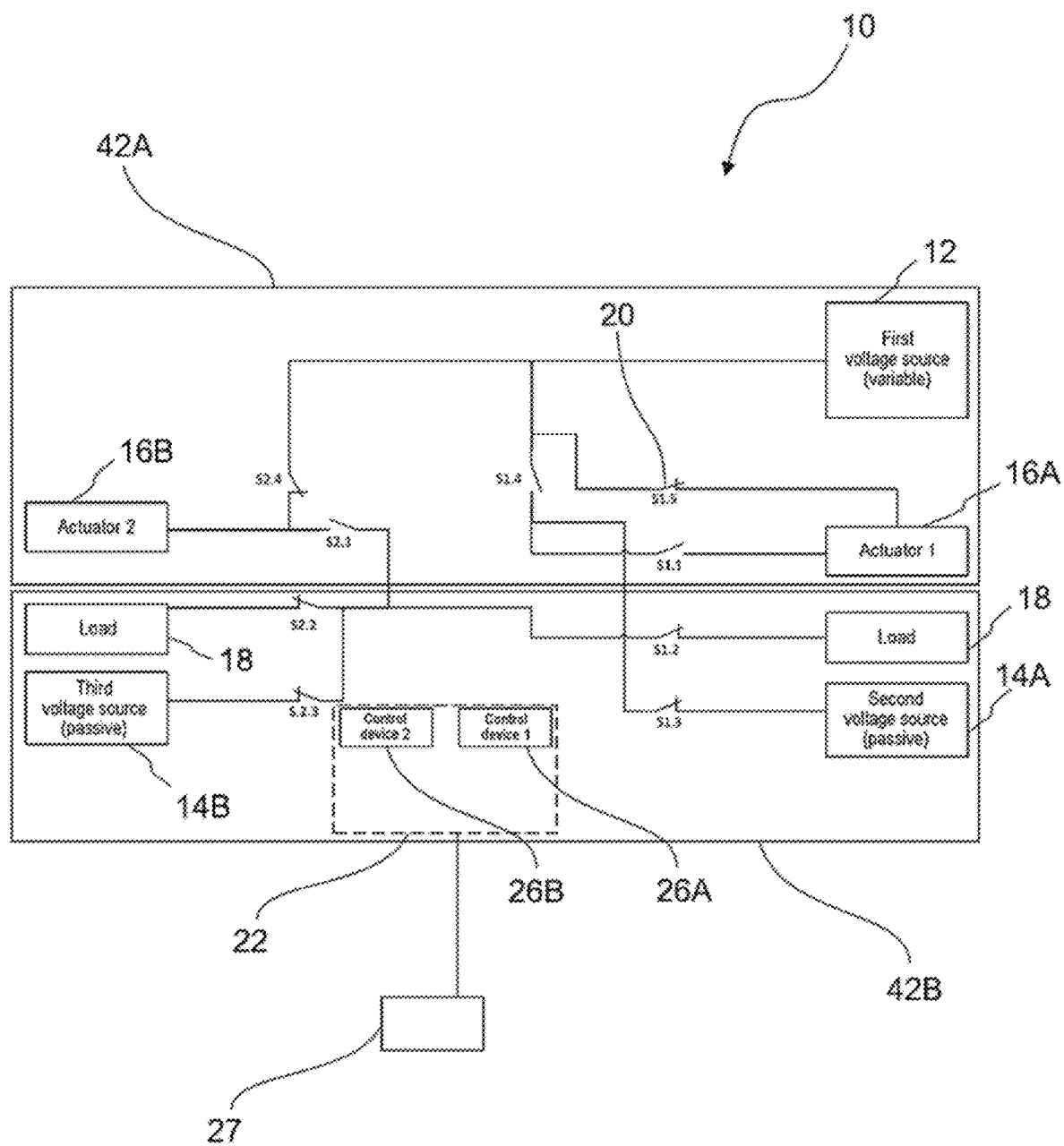
FIG. 3 shows another simplified schematic illustration of an on-board electrical subsystem of a vehicle according to one embodiment of the present disclosure.

The formation of the supply subcircuits 42A, 42B is additionally illustrated in FIG. 3 which shows another simplified schematic illustration of the on-board electrical subsystem 10 of the vehicle according to one embodiment of the present disclosure. Since the embodiment according to FIG. 3 comprises two actuators 16A, 16B, according to this embodiment, the combined total power requirement of the two actuators 16A, 16B is assessed with respect to the first power threshold value. This is purely optional, however. The method 28 can in principle also be applied to single actuators 16A.

It can be seen that in particular the switching devices 20 assigned to the actuators 16A, 16B are used to form the corresponding supply subcircuits 42A, 42B.

Whereas the switches S1.5 and S2.4 are open and the switches S1.1, S1.4 and S2.1 are closed in the normal state of the on-board electrical subsystem 10 shown by way of example in FIG. 1, the so-called bypass switches S1.5 and S2.4 are closed in FIG. 3. In contrast, the switches S1.1, S1.4 and S2.1 are then open such that, according to this embodiment, the first voltage source 12 is coupled exclusively to the first actuator 16A and the second actuator 16B. The rest of the components of the on-board electrical subsystem 10 are decoupled from the first voltage source 12 and are supplied by the second voltage source 14A and the third voltage source 14B within the supply subcircuit 42B.

This opens up the possibility of controlling the variable first voltage source 12 in such a way that the voltage amplitude that is output from the latter is raised above the standard voltage amplitude. A power requirement for the actuators 16A, 16B can thus be satisfied without other non-variable voltage sources, such as the second voltage source 14A, acting as a power sink and causing a power loss. The method 28 therefore allows the on-board electrical subsystem 10 to be operated with a reduced power loss. Additionally, according to the method 28, it is also not necessary to provide further variable voltage sources.

The method 28 can be developed by the optional step 36, whereby, once the supply subcircuits 42A, 42B are formed, the determined total power requirement of the at least one actuator 16A is compared with a second power threshold value. If it is ascertained that the total power requirement of the at least one actuator 16A is lower than the second power threshold value, the separation into the supply subcircuits 42A, 42B is thus reversed.

Consequently, a combined overall supply circuit of the on-board electrical subsystem 10 is in turn formed in step 38. This corresponds by way of example to the embodiment reproduced in FIG. 1.

Should the determined total power requirement be less than the first power threshold value in step 32, the overall supply circuit of the on-board electrical subsystem 10 corresponding to the embodiment reproduced in FIG. 1 is thus retained.

Optionally, the method 28 can also be developed by the step 40, whereby at least one vehicle parameter is measured. The sensor 27 can for example be used for this purpose. The vehicle parameter can then be transmitted to the control device 22 which uses the vehicle parameter as a basis for determining the total power requirement of the at least one actuator 16A.

Figure 4:
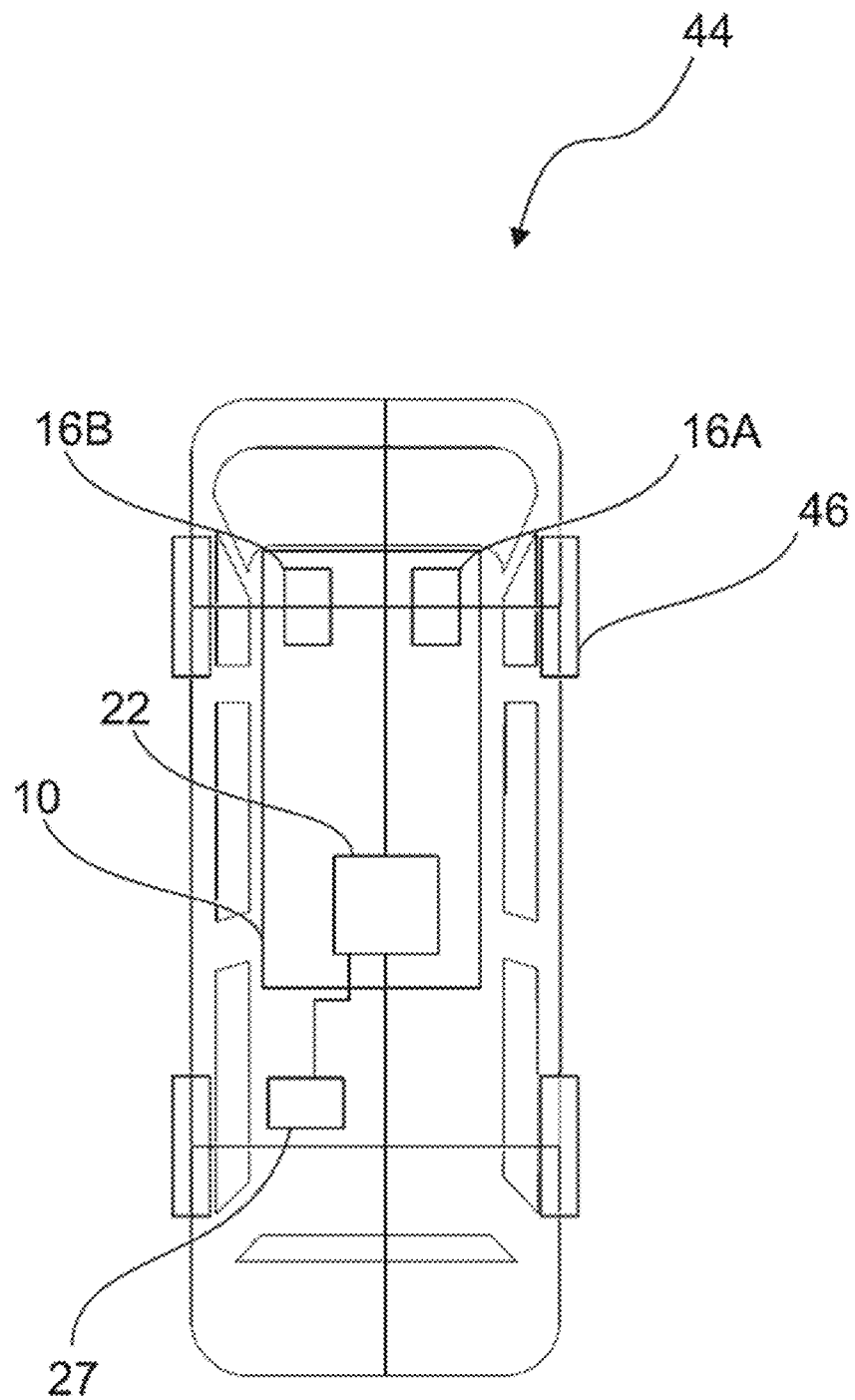
FIG. 4 shows a simplified schematic illustration of a vehicle according to one embodiment of the present disclosure.

FIG. 4 shows a simplified schematic illustration of a vehicle 44 according to one embodiment of the present disclosure.

According to this embodiment, the vehicle 44 has steerable wheels 46 and an on-board electrical subsystem 10. The actuators 16A, 16B are part of a steering system of the vehicle 44 and ensure rotation of the steerable wheels 46. In dependence on various vehicle parameters, such as, for example, the vehicle speed, in order to ensure an intended actuation movement which is intended to be effected by the actuators 16A, 16B, a total power requirement which has to be satisfied by the on-board electrical subsystem 10 in order that the actuators 16A, 16B can also perform the desired actuation movement is required. The present method 28 and the on-board electrical subsystem 10 described herein are advantageous in this regard since short-term increased power requirements can be satisfied without an increased power loss being caused as a result. Moreover, no additional variable voltage sources are required.

Certain embodiments disclosed here, in particular the first voltage source 12 and the control device 22, use circuits (e.g., one or more circuits) to implement standards, protocols, methods or technologies disclosed here, to functionally couple two or more components, to generate information, to process information, to analyze information, to generate signals, to code/decode signals, to convert signals, to transmit and/or to receive signals, to control other devices, etc. Circuits of any kind can be used.

In one embodiment, a circuit such as the control device inter alia comprises one or more data processing devices such as a processor (e.g. a microprocessor), a central processing unit (CPU), a digital signal processor (DSP), an application-specific integrated circuit (ASIC), a field-programmable gate array (FPGA), a system on a chip (SoC) or similar or any combinations thereof and can comprise discrete digital or analog circuit elements or electronics or combinations thereof. In one embodiment, the circuit comprises hardware circuit implementations (e.g. implementations in analog circuits, implementations in digital circuits and the like and combinations thereof).

In one embodiment, circuits comprise combinations of circuits and computer program products having software or firmware instructions which are stored on one or more computer-readable memories and interact to cause a device to perform one or more of the protocols, methods or technologies described here. In one embodiment, the circuit technology comprises circuits, such as, e.g., microprocessors or parts of microprocessors, which to operate require software, firmware and the like. In one embodiment, the circuits comprise one or more processors or parts thereof and the associated software, firmware, hardware and the like.

In the present application, reference may be made to amounts and numbers. Unless explicitly stated otherwise, such amounts and numbers are not to be considered as limiting but rather as examples for the possible amounts or numbers in the context of the present application. In this context, the term "plurality" can also be used to refer to an amount or number in the present application. In this context, the term "plurality" is meant to mean any number greater than one, e.g. two, three, four, five, etc. The terms "approximately", "about", "close to", etc., mean plus or minus 5% of the stated value.

Although the disclosure has been described and illustrated with reference to one or more embodiments, a person skilled in the art, after reading and understanding this description and the attached drawings, will be able to make equivalent changes and modifications.

What is claimed is:

1. A method for operating an on-board electrical subsystem in a vehicle, wherein the on-board electrical subsystem comprises a first actuator, a load, a first voltage source, a second voltage source, and a switching device, wherein the first voltage source is a variable voltage source configured to selectably provide a standard voltage amplitude and an increased voltage amplitude which is greater than the standard voltage amplitude, wherein the second voltage source passively provides the standard voltage amplitude, and wherein the first actuator has a respective variable power requirement, the method comprising the steps of:
- determining a total power requirement including the first actuator;
- when the total power requirement is less than a first power threshold value, configuring the first voltage source, the second voltage source, and the switching device to supply the standard voltage amplitude to the first actuator and to the load in a normal state of the on-board electrical subsystem; and
- when the total power requirement exceeds the first power threshold value:
  - configuring the switching device to form a first supply subcircuit including the first actuator and the first voltage source; and
  - configuring the switching device to form a second supply subcircuit including the load and the second voltage source, wherein the second supply subcircuit is separated from the first supply subcircuit by the switching device, and wherein the first voltage source provides the increased voltage amplitude to the first supply subcircuit while (A) the load is separated from the first voltage source and (B) the second voltage source provides the standard voltage amplitude to the load.

2. The method of claim 1, wherein the on-board electrical subsystem further comprises a second actuator having a respective variable power requirement, wherein the total power requirement comprises a combined total power requirement of the first actuator and the second actuator, and wherein the first supply subcircuit additionally includes the second actuator to provide the increased voltage amplitude to the second actuator.

3. The method of claim 1 further comprising the steps of:
- comparing the total power requirement to a second power threshold value; and
- when the total power requirement falls below the second power threshold value, then reconfiguring the switching device, the first voltage source, and the second voltage source to supply the standard voltage amplitude to the first actuator and to the load in the normal state of the on-board electrical subsystem.

4. The method of claim 3, characterized in that the first power threshold value and the second power threshold value are the same.

5. The method of claim 1 further comprising the steps of:
- determining a measured vehicle parameter; and
- determining the total power requirement based on the measured vehicle parameter, wherein the measured vehicle parameter is comprised of a vehicle speed, a steering wheel rotation speed, an ambient temperature, a temperature of one of the voltage sources, or a state of charge of one of the voltage sources.

6. An on-board electrical subsystem for a vehicle comprising:
- a first voltage source which is a variable voltage source configured to selectably provide a standard voltage amplitude and an increased voltage amplitude which is greater than the standard voltage amplitude;
- a second voltage source passively providing the standard voltage amplitude;
- a first actuator having a respective variable power requirement, wherein the respective variable power requirement is comprised of the standard voltage amplitude when in a normal state of the on-board electrical subsystem;
- a load which requires the standard voltage amplitude;
- at least one switching device selectably interconnecting the first actuator, load, first voltage source, and second voltage source; and
- a control device coupled to the switching device configured for:
  - determining a total power requirement including the first actuator;
  - when the total power requirement is less than a first power threshold value, configuring the first voltage source, the second voltage source, and the switching device to supply the standard voltage amplitude to the first actuator and to the load in a normal state of the on-board electrical subsystem; and
  - when the total power requirement exceeds the first power threshold value then configuring the switching device to form a first supply subcircuit including the first actuator and the first voltage source and configuring the switching device to form a second supply subcircuit including the load and the second voltage source, wherein the second supply subcircuit is separated from the first supply subcircuit by the switching device, and wherein the first voltage source provides the increased voltage amplitude to the first supply subcircuit whereby the load is separated from the first voltage source, and whereby the second voltage source provides the standard voltage amplitude to the load.

7. The on-board electrical subsystem of claim 6 further comprising:
- a second actuator; and
- a plurality of switching devices which are coupled to the control device and are arranged to selectably provide an electrical bypass for the first and second actuators independently of the second voltage source.

8. The on-board electrical subsystem of claim 6 wherein the control device is configured to adjust the increased voltage amplitude of the first voltage source to match the determined total power requirement.

9. The on-board electrical subsystem of claim 6 further comprising:
- a sensor coupled to the control device which is configured to measure at least one vehicle parameter comprised of at least one of a vehicle speed, a steering wheel rotation speed, an ambient temperature, a temperature at least of one of the voltage sources, or a state of charge at least of one of the voltage sources.

* * * * *